US012510857B2

(12) United States Patent
Kimata et al.

(10) Patent No.: US 12,510,857 B2
(45) Date of Patent: Dec. 30, 2025

(54) IMAGE FORMING APPARATUS, METHOD FOR CONTROLLING CONVEYANCE OF RECORDING MEDIUM, AND NON-TRANSITORY RECORDING MEDIUM

(71) Applicant: Konica Minolta, Inc., Tokyo (JP)

(72) Inventors: Akinori Kimata, Toyokowa (JP); Takahiro Tsujimoto, Toyokawa (JP); Noriyuki Jinbo, Hamamatsu (JP); Kenichi Hayashi, Anjo (JP); Shiro Umeda, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 2 days.

(21) Appl. No.: 18/414,754

(22) Filed: Jan. 17, 2024

(65) Prior Publication Data

US 2024/0255878 A1 Aug. 1, 2024

(30) Foreign Application Priority Data

Jan. 26, 2023 (JP) ................................ 2023-010212

(51) Int. Cl.
*G03G 15/00* (2006.01)

(52) U.S. Cl.
CPC ..... *G03G 15/5029* (2013.01); *G03G 15/6529* (2013.01)

(58) Field of Classification Search
CPC ........... G03G 15/5029; G03G 15/5062; G03G 15/55; G03G 15/6508
See application file for complete search history.

(56) References Cited

U.S. PATENT DOCUMENTS

2017/0242389 A1* 8/2017 Asakawa ............... G03G 15/70
2021/0048771 A1* 2/2021 Kawabata .......... G03G 15/6594
(Continued)

FOREIGN PATENT DOCUMENTS

JP 2017170859 A 9/2017
JP 2018106112 A 7/2018
(Continued)

OTHER PUBLICATIONS

Office Action (Notice of Reasons for Refusal) issued on Sep. 24, 2024, by the Japanese Patent Office in corresponding Japanese Patent Application No. 2023-010212, and an English Translation of the Office Action. (18 pages).
(Continued)

*Primary Examiner* — Jessica L Eley
(74) *Attorney, Agent, or Firm* — BUCHANAN INGERSOLL & ROONEY PC

(57) ABSTRACT

An image forming apparatus includes a sensor that detects information relating to the first recording medium and information relating to the second recording medium; and a hardware processor that causes the sensor to detect information relating to the first recording medium conveyed first by the conveyance section and to detect information relating to the second recording medium conveyed by the conveyance section after the first recording medium, causes the conveyance section to operate such that the second recording medium is conveyed at a conveyance speed based on the information relating to the first recording medium, and causes the conveyance section to operate such that the second recording medium is conveyed at the conveyance speed maintained even when the information relating to the second recording medium after the first recording medium is detected to be different from the information relating to the first recording medium.

17 Claims, 10 Drawing Sheets

(56) References Cited

U.S. PATENT DOCUMENTS

| | | | | |
|---|---|---|---|---|
| 2021/0364973 | A1* | 11/2021 | Kimura | G03G 15/6561 |
| 2022/0019163 | A1* | 1/2022 | Kurata | G03G 15/2028 |

FOREIGN PATENT DOCUMENTS

| | | | |
|---|---|---|---|
| JP | 2019095486 | A | 6/2019 |
| JP | 2022075115 | A | 5/2022 |
| JP | 2022115247 | A | 8/2022 |
| JP | 2022134448 | A | 9/2022 |
| JP | 2023010212 | A | 1/2023 |

OTHER PUBLICATIONS

Office Action (Notice of Reasons for Refusal) issued on Feb. 20, 2025, by the Japanese Patent Office in corresponding Japanese Patent Application No. 2023-123399, and an English Translation of the Office Action. (11 pages).

Office Action (Notice of Reasons for Refusal) issued on Oct. 10, 2024, by the Japanese Patent Office in corresponding Japanese Patent Application No. 2023-123399, and an English Translation of the Office Action. (12 pages).

* cited by examiner

FIG. 6

| SHEET TYPE | SHEET FEED SPEED mm/s | PROCESS SPEED mm/s |
|---|---|---|
| PLAIN PAPER | 400 | 300 |
| THICK SHEET 1 | 200 | 170 |
| THICK SHEET 2 | 200 | 140 |
| THICK SHEET 3 | 150 | 120 |
| RECYCLED SHEET | 400 | 300 |

FIG. 7

| SHEET TYPE | LOWER LIMIT OF BASIS WEIGHT | UPPER LIMIT OF BASIS WEIGHT |
|---|---|---|
| PLAIN PAPER | 52 | 90 |
| THICK SHEET 1 | 91 | 157 |
| THICK SHEET 2 | 158 | 209 |
| THICK SHEET 3 | 210 | 300 |

FIG. 10

| DETECTION MEANS | OPTICAL SENSOR | ULTRASONIC SENSOR | DISPLACEMENT SENSOR | SHEET REGULATING PLATE POSITION SENSOR | CMOS SENSOR | ELECTROSTATIC SENSOR | CURRENT DETECTION |
|---|---|---|---|---|---|---|---|
| SHEET INFORMATION | SHEET TYPE | SHEET TYPE | STIFFNESS | SIZE | GRAIN DIRECTION | MOISTURE | RESISTANCE |
| | TRANSMITTANCE | | THICKNESS | | COLOR | BASIS WEIGHT | |
| | REFLECTANCE | | | | SMOOTHNESS | | |
| | BASIS WEIGHT | | | | PULP MATERIAL | | |
| | COATING AGENT | | | | | | |
| | FLUORESCENT AGENT | | | | | | |
| | FILLER | | | | | | |
| | COLOR INFORMATION | | | | | | |
| | PULP MATERIAL | | | | | | |

FIG. 11

| SHEET TYPE | | PROCESS SPEED mm/s | | FIXING TEMPERATURE °C | | TRANSFER VOLTAGE V | |
|---|---|---|---|---|---|---|---|
| BEFORE SWITCHING | AFTER SWITCHING | BEFORE SWITCHING | AFTER SWITCHING | BEFORE SWITCHING | AFTER SWITCHING | BEFORE SWITCHING | AFTER SWITCHING |
| PLAIN PAPER | THICK SHEET 1, 1+ | 300 | 300 | 180 | 210 | 1400 | 1700 |
| **PLAIN PAPER** | **THICK SHEET 2** | **300** | **300** | **180** | **230** | **1400** | **1900** |
| PLAIN PAPER | THICK SHEETS 3, 4 | 300 | 300 | 180 | 250 | 1400 | 2100 |
| THICK SHEET 1, 1+ | PLAIN PAPER | 170 | 170 | 160 | 140 | 1500 | 1250 |
| THICK SHEET 1, 1+ | THICK SHEET 2 | 170 | 170 | 160 | 160 | 1500 | 1450 |
| THICK SHEET 1, 1+ | THICK SHEETS 3, 4 | 170 | 170 | 160 | 180 | 1500 | 1650 |
| THICK SHEET 2 | ... | 140 | 140 | ... | ... | ... | ... |
| THICK SHEETS 3, 4 | ... | 120 | 120 | ... | ... | ... | ... |

IMAGE FORMING APPARATUS, METHOD FOR CONTROLLING CONVEYANCE OF RECORDING MEDIUM, AND NON-TRANSITORY RECORDING MEDIUM

CROSS-REFERENCE TO RELATED APPLICATION

The disclosure of Japanese Patent Application No. 2023-010212 filed on Jan. 26, 2023, including description, claims, drawings, and abstract, is incorporated herein by reference in its entirety.

BACKGROUND

1. Technological Field

The present invention relates to an image forming apparatus such as a copier, a printer, or a digital multifunction apparatus called a multifunction peripheral (MFP), a method for controlling conveyance of a recording medium, and a non-transitory recording medium.

2. Description of the Related Art

An image forming apparatus that includes a medium detection sensor that detects the type of recording medium such as a sheet is known. Patent Literature 1 (Japanese Unexamined Patent Application Publication No. 2018-106112) discloses an image forming apparatus having control means that interrupts an image forming process when the type of a recording medium detected by a medium detection sensor is different from the type of a recording medium on which an image has already been formed and corresponding image forming conditions are also different.

However, as in the image forming apparatus described in Patent Literature 1, when the image forming process is interrupted in a case where the type of recording medium is changed during printing, there is a problem in that productivity decreases.

SUMMARY

An object of the present invention is to provide an image forming apparatus, a method for controlling conveyance of a recording medium, and a non-transitory recording medium that can prevent a decrease in productivity even when the type of recording medium changes during printing.

A first aspect of the present invention relates to an image forming apparatus including:

a conveyance section that conveys a first recording medium and a second recording medium;

a sensor that detects information relating to the first recording medium and information relating to the second recording medium; and a hardware processor that causes the sensor to detect the information relating to the first recording medium conveyed first by the conveyance section and to detect the information relating to the second recording medium conveyed by the conveyance section after the first recording medium in a job, causes the conveyance section to operate such that the first recording medium is conveyed at a first conveyance speed to detect the information, and the second recording medium is conveyed at a second conveyance speed based on the information relating to the first recording medium, and causes the conveyance section to operate such that the second recording medium is conveyed at the conveyance speed maintained and to operate such that a recording medium, conveyed first of a job next to the job that the information relating to the second recording medium after the first is detected to be different from the information relating to the first recording medium, is conveyed at the first conveyance speed again when the information relating to the second recording medium after the first recording medium is detected to be different from the information relating to the first recording medium.

A second aspect of the present invention relates to a method for controlling conveyance of a recording medium, the method including:

causing a conveyance section to convey a first recording medium and a second recording medium;

causing a sensor to detect information relating to the first recording medium conveyed first by a sensor and to detect information relating to the second recording medium conveyed after the first recording medium in a job;

controlling the conveyance section to convey the second recording medium at a conveyance speed based on the information relating to the first recording medium, and controlling the conveyance section to convey the second recording medium at the conveyance speed maintained and to operate such that a recording medium, conveyed first of a job next to the job that the information relating to the second recording medium after the first is detected to be different from the information relating to the first recording medium, is conveyed at the first conveyance speed again the information relating to the second recording medium after the first recording medium is detected to be different from the information relating to the first recording medium.

A third aspect of the present invention relates to a non-transitory recording medium storing a program for causing a computer of an image forming apparatus to execute:

causing a conveyance section to convey a first recording medium and a second recording medium;

causing a sensor to detect information relating to the first recording medium conveyed first and to detect information relating to the second recording medium conveyed after the first recording medium in a job;

controlling the conveyance section to convey the second recording medium at a conveyance speed based on the information relating to the first recording medium, and controlling the conveyance section to convey the second recording medium at the conveyance speed maintained and to operate such that a recording medium, conveyed first of a job next to the job that the information relating to the second recording medium after the first is detected to be different from the information relating to the first recording medium, is conveyed at the first conveyance speed again the information relating to the second recording medium after the first recording medium is detected to be different from the information relating to the first recording medium.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention.

FIG. 6 is a table illustrating a relationship between a sheet type and a conveyance speed;

FIG. 7 is a table illustrating a relationship between a sheet type and a basis weight;

FIG. 10 is a table in which information relating to a recording medium detectable by each recording medium detector is summarized;

FIG. 11 is a table illustrating relationships between conveyance speeds and image forming conditions before and after a sheet type is switched.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
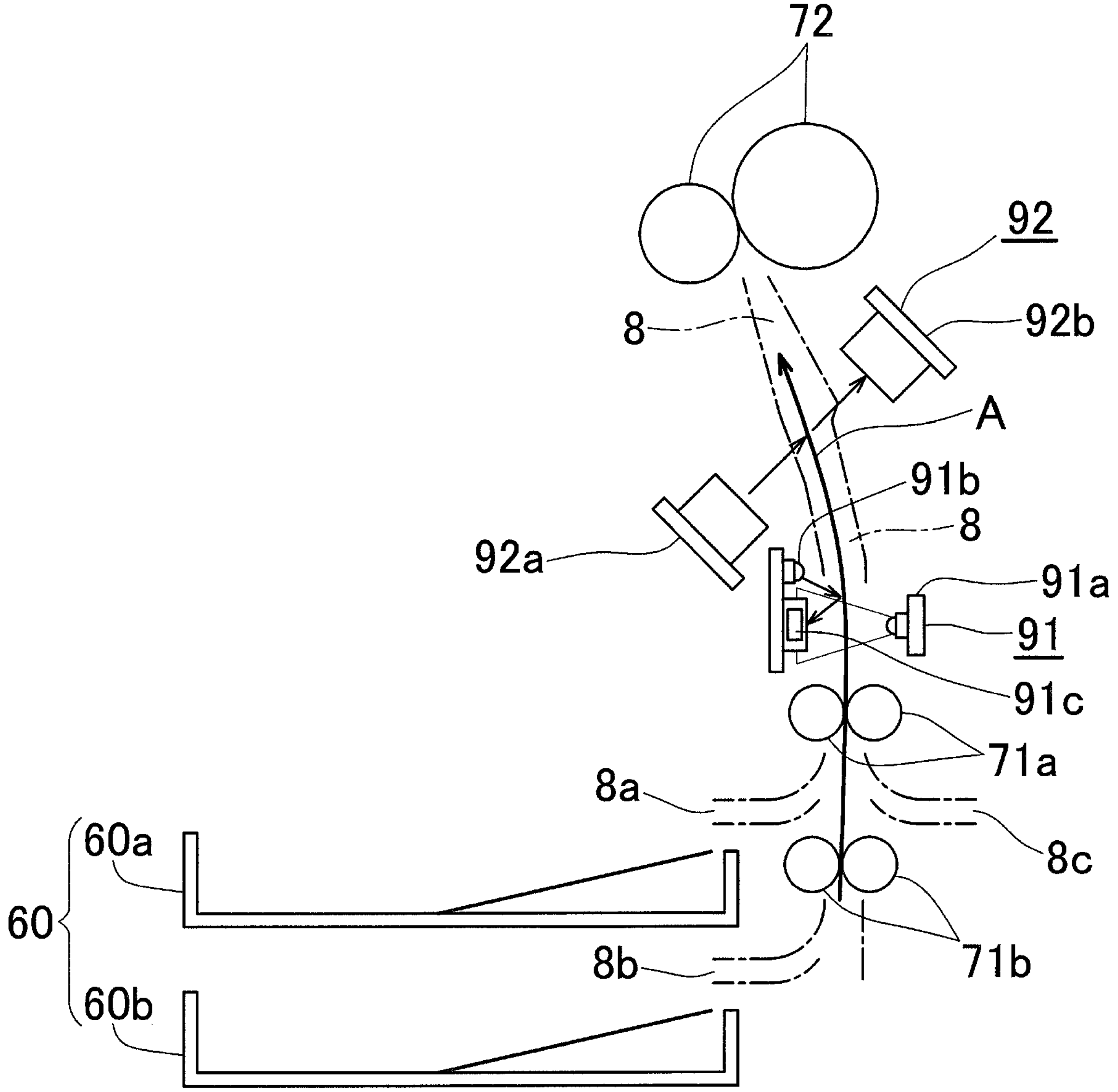
FIG. 1 is a diagram schematically illustrating a part of a conveyance path for a sheet on which an image is printed in an image forming apparatus.

FIG. 1 is a diagram schematically illustrating a part of a conveyance path for a recording medium (hereinafter, the recording medium is also referred to as a sheet or paper) on which an image is printed in an image forming apparatus 1 according to an embodiment of the present invention.

Examples of the image forming apparatus 1 include, but are not limited to, a copier, a printer, and an MFP which is a digital multifunction apparatus.

In FIG. 1, a sheet feed section 60 is provided at a lower portion of the image forming apparatus 1. In the sheet feed section 60, a first sheet feed tray 60*a* which is a first-stage sheet feed cassette in an upper stage and a second sheet feed tray 60*b* which is a second-stage sheet feed cassette in a lower stage are arranged. A sheet conveyance path 8 is formed in a vertical direction so as to communicate with a sheet feed port 8*a* of the first sheet feed tray 60*a* and a sheet feed port 8*b* of the second sheet feed tray 60*b*. A sheet fed from the sheet feed port 8*a* of the first sheet feed tray 60*a* or the sheet feed port 8*b* of the second sheet feed tray 60*b* to the sheet conveyance path 8 is conveyed upward in the sheet conveyance path 8 as indicated by an arrow A. The sheet is conveyed to a pair of skew correction rollers 72 installed at the position of an upper portion of the sheet conveyance path 8 by conveyance rollers (corresponding to a sheet conveyance section) 71*a* and 71*b*, and the like.

Further, a manual sheet feed tray (not illustrated) is provided on the opposite side of the first sheet feed tray 60*a* with the sheet conveyance path 8 interposed therebetween. A sheet set on the manual sheet feed tray is supplied to the sheet conveyance path 8 via a manual sheet feed port 8*c*.

Each of the first sheet feed tray 60*a*, the second sheet feed tray 60*b*, and the manual sheet feed tray corresponds to a holder that holds a sheet. A user can open and close the first sheet feed tray 60*a*, the second sheet feed tray 60*b*, and the manual feed tray with respect to the image forming apparatus 1. Opening the first sheet feed tray 60*a* and the second sheet feed tray 60*b* means removing the first sheet feed tray (sheet feed cassette) 60*a* and the second sheet feed tray (sheet feed cassette) 60*b* from a main body of the apparatus for the purpose of replacement of a sheet, addition of a sheet, or the like. Opening the manual sheet feed tray means that a sheet is removed from the manual sheet feed tray to bring the manual sheet feed tray into a non-use state.

On the other hand, closing the first sheet feed tray 60*a* and the second sheet feed tray 60*b* means attaching the first sheet feed tray 60*a* and the second sheet feed tray 60*b* to the main body of the apparatus. Closing the manual feed tray means setting a sheet on the manual feed tray and bringing the manual feed tray into a use state.

Further, opening the first sheet feed tray 60*a*, the second sheet feed tray 60*b*, and the manual feed tray is also referred to as opening the sheet feed ports 8*a*, 8*b*, and 8*c*. Closing the first sheet feed tray 60*a*, the second sheet feed tray 60*b*, and the manual feed tray is also referred to as closing the sheet feed ports 8*a*, 8*b*, and 8*c*. The opening and closing of the first sheet feed tray 60*a* and the second sheet feed tray 60*b* can be detected by a sensor (not illustrated). The opening and closing of the manual feed tray can be detected based on whether a sheet is present on the manual sheet feed tray.

The skew correction rollers 72 are rollers for correcting skew (inclination) of a sheet conveyed in the sheet conveyance path 8.

Between the sheet feed port 8*a* of the first sheet feed tray 60*a* in the upper stage and the skew correction rollers 72, two medium detection sensors 91 and 92 are arranged on the upstream side and the downstream side in a conveyance direction in the sheet conveyance path 8. Each of the medium detection sensors 91 and 92 detects a physical property value of a sheet that is an example of information relating to the sheet (hereinafter, the information relating to the sheet is also referred to as sheet information). The medium detection sensor 91 on the upstream side is an optical sensor that detects light emitted to the sheet. The medium detection sensor 92 on the downstream side is an ultrasonic sensor that detects an ultrasonic wave output toward the sheet. The optical sensor 91 may be disposed on the upstream side, and the ultrasonic sensor 92 may be disposed on the downstream side.

Figure 2:
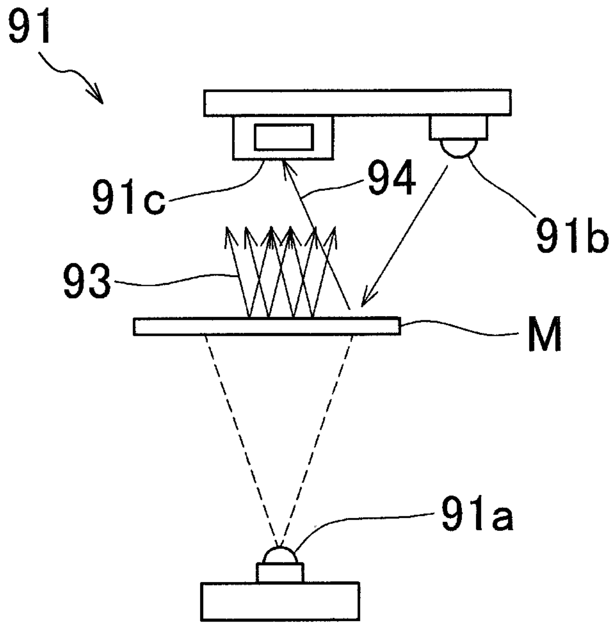
FIG. 2 is an explanatory diagram illustrating an optical sensor.

FIG. 2 is an explanatory diagram illustrating the optical sensor 91. The optical sensor 91 includes a transmission light source 91*a* such as an LED, a reflection light source 91*b* such as an LED, and a light receiving element 91*c* such as a photodiode. The amount of transmitted light 93, which is light emitted from the transmission light source 91*a* and transmitted through a sheet M conveyed in the sheet conveyance path 8, and the amount of reflected light 94, which is light emitted from the reflection light source 91*b* and reflected by the sheet M, are detected as physical property values by the light receiving element 91*c*. Then, based on the detected levels of the amount of the transmitted light and the amount of the reflected light, a controller 100 described later determines the type of the sheet M (a basis weight, an OHP sheet, a recycled sheet, coated sheet, or the like). Based on this determination, the controller 100 detects the type of sheet (sheet type) that is another example of the sheet information. The optical sensor 91 may include a plurality of sensor groups corresponding to red, green, and blue colors, for example.

Figure 3:
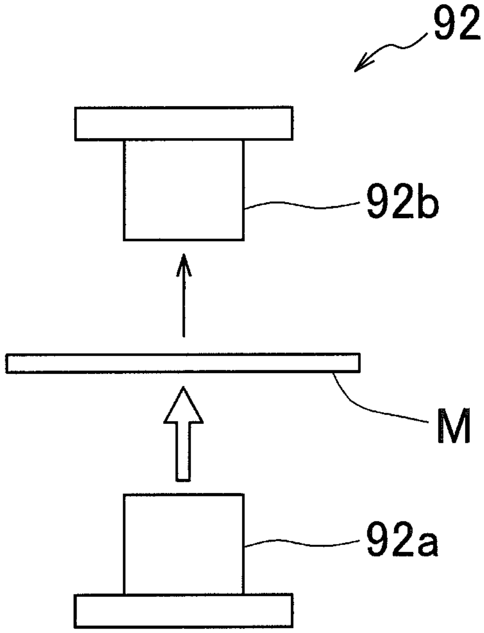
FIG. 3 is an explanatory diagram illustrating an ultrasonic sensor.

FIG. 3 is an explanatory diagram illustrating the ultrasonic sensor 92. The ultrasonic sensor 92 includes a pair of an ultrasonic transmitter 92*a* and an ultrasonic receiver 92*b* which are obliquely opposed to each other with the sheet conveyance path 8 interposed therebetween with respect to a direction in which the sheet M passes (see FIG. 1). The ultrasonic sensor 92 transmits an ultrasonic wave from the ultrasonic transmitter 92*a* to the passing sheet M, and receives the ultrasonic wave transmitted through the sheet M by the ultrasonic receiver 92*b*. Then, the controller 100, which will be described later, detects the type of the sheet M as information relating to the sheet by determining whether the sheet M is a single sheet or a two-ply sheet (envelope) based on the amount of attenuation of the ultrasonic wave by the sheet M.

Figure 4:
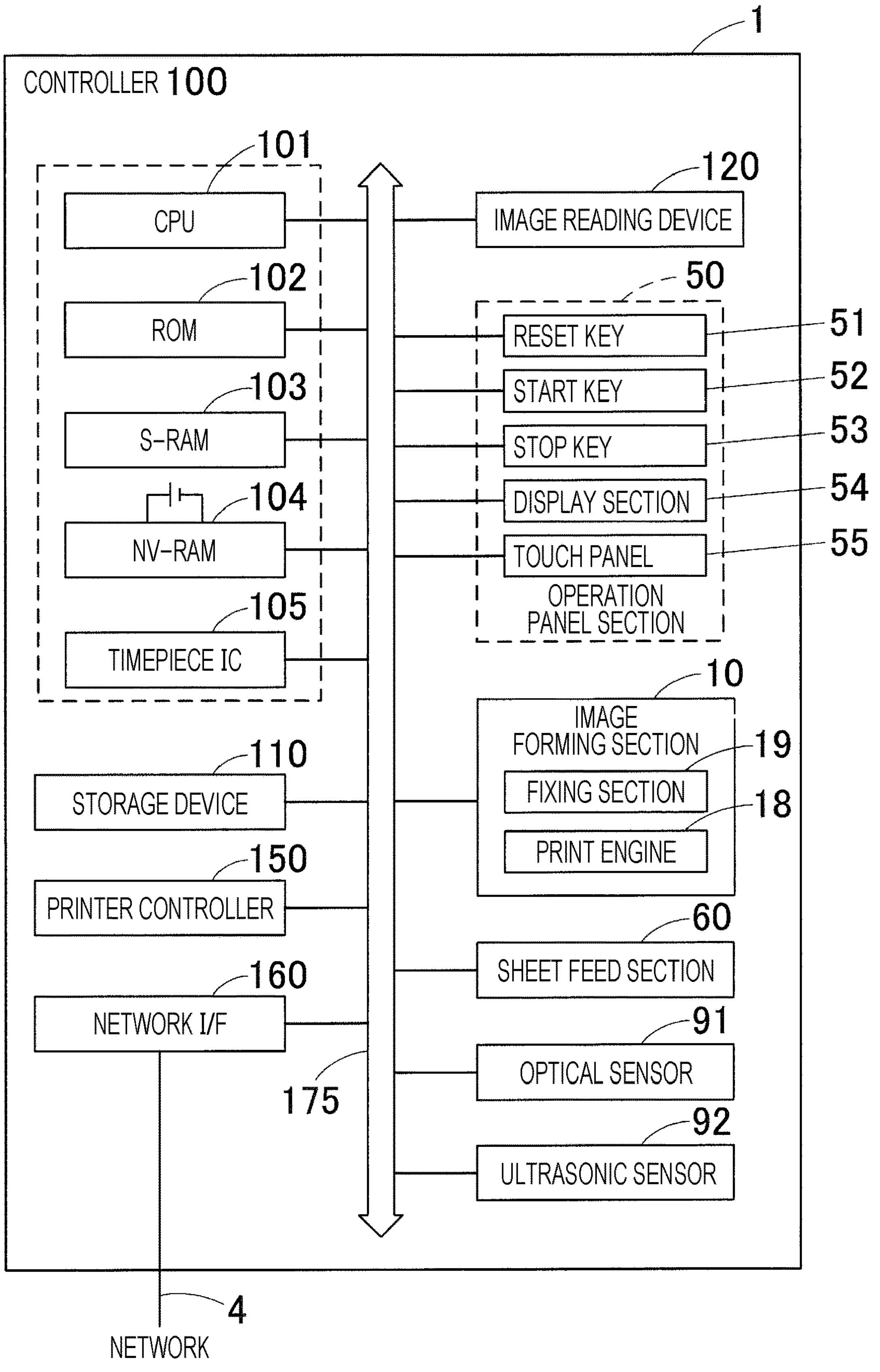
FIG. 4 is a block diagram illustrating an electrical configuration of the image forming apparatus.

FIG. 4 is a block diagram illustrating an electrical configuration of the image forming apparatus 1. As illustrated in FIG. 4, the image forming apparatus 1 includes the controller 100, a storage device 110, an image reading device 120, an operation panel section 50, an image forming section 10, a sheet feed section 60, the optical sensor 91, and the ultrasonic sensor 92. The image forming apparatus 1 further includes a printer controller 150 and a network interface (network I/F) 160. These components are connected to each other via a system bus 175.

The controller 100 includes a central processing unit (CPU) 101, a read only memory (ROM) 102, a static random access memory (S-RAM) 103, a nonvolatile RAM (NV-RAM) 104, and a timepiece IC 105.

The CPU 101 comprehensively controls the entire image forming apparatus 1 by executing an operation program stored in the ROM 102 or the like. For example, the CPU 101 controls a copy function, a printer function, a scan function, and the like such that the copy function, the printer function, the scan function, and the like are executable. In particular, in this embodiment, the CPU 101 executes detection of physical property values of a sheet based on detection of an amount of light by the optical sensor 91 and detection of an ultrasonic wave by the ultrasonic sensor 92. The CPU 101 determines the sheet type based on the results of the detection, automatically sets an image forming condition corresponding to the sheet type based on the determination result for printing, and executes the printing. The CPU 101 stores and accumulates the physical property values of the sheet detected by the optical sensor 91 and the ultrasonic sensor 92, the determination result of the sheet type, and the like in the storage device 110. The CPU 101 further executes control processing such as output to the operation panel section 50 or an external apparatus.

The ROM 102 stores programs to be executed by the CPU 101 and other information.

The S-RAM 103 serves as a work area for the CPU 101 to execute a program, and temporarily stores the program, data for executing the program, and the like.

The NV-RAM 104 Is a nonvolatile memory backed up by a battery. The NV-RAM 104 stores various settings relating to image formation, the number of pixels of a display section 54, data of various screens to be displayed on the display section 54, and the like.

The timepiece IC 105 measures time, functions as an internal timer, and measures a processing time.

The storage device 110 includes a hard disk or the like, and stores programs, various types of data, and the like. In particular, in this embodiment, the storage device 110 accumulates the results of detecting the sheet physical property values by the optical sensor 91 and the ultrasonic sensor 92, the determination result of the sheet type, a detection history, and the like.

The image reading device 120 includes a scanner or the like, reads a document set on a platen glass by scanning the document, and converts the read document into image data.

The operation panel section 50 is used for a user to provide an instruction such as a job to the image forming apparatus 1 and set various settings. The operation panel section 50 includes a reset key 51, a start key 52, a stop key 53, the display section 54, and a touch panel 55.

The reset key 51 is used to reset a setting. The start key 52 is used for a start operation such as scanning. The stop key 53 is pressed to interrupt the operation.

The display section 54 includes, for example, a liquid crystal display device, and outputs and displays messages, various operation screens, and the like. The touch panel 55 is formed on a screen of the display section 54, and detects a user's touch operation.

The image forming section 10 prints, on a sheet, a copy image generated from image data of a document read by the image reading device 120 or from print data transmitted from an external terminal apparatus 3 or the like. The image forming section 10 includes a print engine 18 and a fixing section 19 that fixes an image by heating and pressing a sheet on which the image is formed. The print engine 18 includes hardware components for image formation, such as a photosensitive drum, a charging device, an exposure device, a developing device, a transfer belt, and a transfer roller.

The network I/F160 functions as communication means that transmits and receives data to and from the external apparatus via a network 4. Examples of the external apparatus include an external server, a cloud system, a printer driver of an information terminal apparatus of a user, and other image forming apparatuses.

Figure 5:
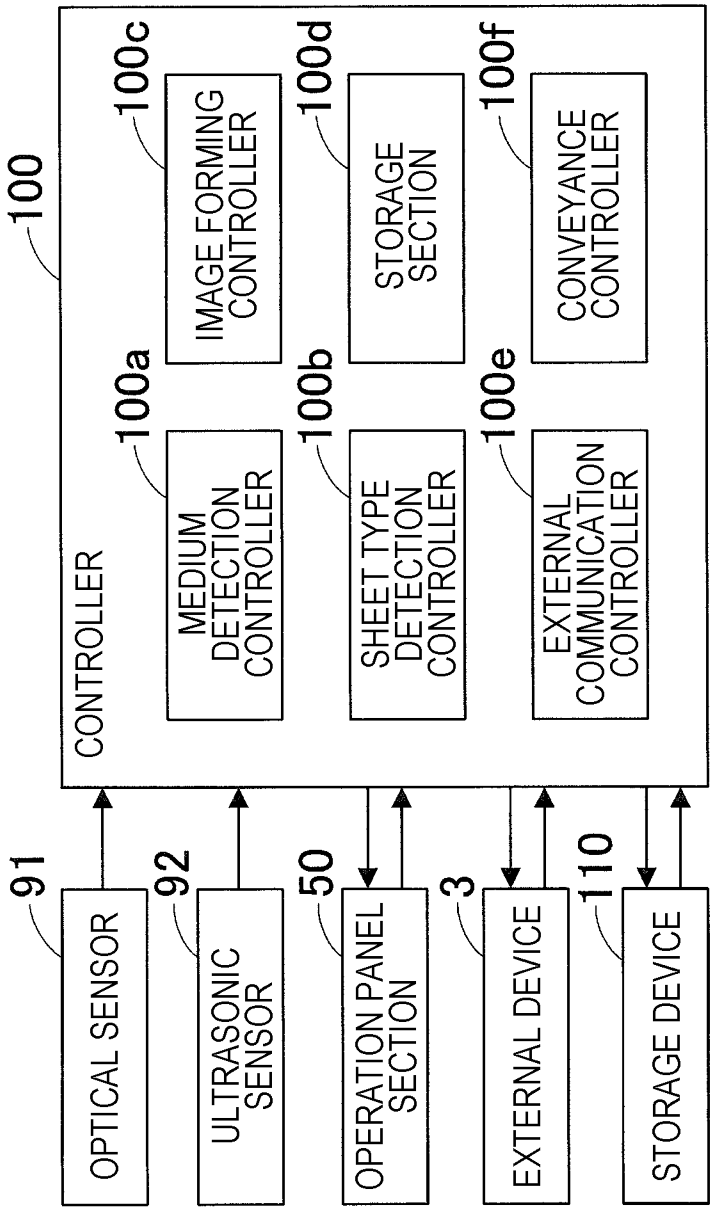
FIG. 5 is a block diagram illustrating a functional configuration of a controller of the image forming apparatus.

FIG. 5 is a block diagram illustrating a functional configuration of the controller 100. The controller 100 functionally includes a medium detection controller 100*a*, a sheet type detection controller 100*b*, an image forming controller 100*c*, a storage section 100*d*, an external communication controller 100*e*, and a conveyance controller 100*f*.

The medium detection controller 100*a* causes the optical sensor 91 and the ultrasonic sensor 92, which are medium detection sensors, to operate in a first detection mode and a second detection mode, which will be described later, to detect physical properties and the like of a sheet. The sheet type detection controller 100*b* detects the sheet type that is sheet information based on the results of the detection by the optical sensor 91 and the ultrasonic sensor 92.

The image forming controller 100*c* controls the image forming section 10 under an image forming condition corresponding to each sheet type based on the sheet type detected by the sheet type detection controller 100*b*, and prints an image on the sheet.

The storage section 100*d* temporarily stores the results of detecting the physical property values of the sheet by the optical sensor 91 and the ultrasonic sensor 92, the result of detecting the sheet type by the sheet type detection controller 100*b*, the detection history, and the like. The information stored in the storage section 100*d* is transferred to the storage device 110 illustrated in FIG. 4, and is accumulated and updated.

The external communication controller 100*e* corresponds to the network I/F160 illustrated in FIG. 2. The external communication controller 100*e* transmits and receives data to and from the external apparatus 3 including a terminal apparatus, an external server, another image forming apparatus, or the like.

The conveyance controller 100*f* controls feeding and conveyance of a sheet.

Next, the operation of the image forming apparatus 1 will be described focusing on control by the controller 100.

In this embodiment, in each of the first detection mode and the second detection mode, the controller 100 causes the optical sensor 91 and the ultrasonic sensor 92 to detect physical property values and a sheet type of a sheet conveyed in the sheet conveyance path 8.

The first detection mode is executed on the first sheet conveyed first. For the first sheet to be conveyed first, the first sheet feed tray 60*a* or the second sheet feed tray 60*b* is opened (removed) to perform replacement, supplement, addition, or the like of a sheet. The first sheet is a sheet to be conveyed first after the first sheet feed tray 60*a* or the second sheet feed tray 60*b* is closed (inserted). Alternatively, in the case of the manual sheet feed tray, the first sheet to be conveyed first is a sheet to be conveyed first after the result of detection as to whether a sheet is present indicates that a sheet is present after a state in which no sheet is present, that is, after the manual sheet feed tray is closed. Alternatively, the first sheet to be conveyed first is a sheet to be conveyed first from a sheet feed port having no sheet type information after sheet type information is reset by turning off and on the image forming apparatus 1, recovering from sleep, or the like. Alternatively, the first sheet to be conveyed first is a sheet to be conveyed first from a sheet feed port when a medium detection function is switched from OFF to ON. Alternatively, the sheet to be conveyed first is a sheet to be conveyed first in a print job.

The sheet feeding performance affects a basis weight and a sheet feed speed of a sheet. In general, as the basis weight increases, the sheet feeding performance decreases. Therefore, the conveyance speed is decreased to stabilize the sheet feeding performance. FIG. 6 illustrates a relationship between a sheet type and a conveyance speed. The sheet feed speed illustrated in FIG. 6 is a conveyance speed at which a sheet is conveyed to the skew correction rollers 72. A process speed is a conveyance speed at which a sheet is conveyed during image formation. FIG. 7 illustrates a relationship between a sheet type and a basis weight.

Information relating to the first sheet detected in the first detection mode is undetermined. Therefore, in the first detection mode, conveyance at a low conveyance speed (sheet feed speed) is performed up to the skew correction rollers 72. To be specific, the sheet is conveyed at a sheet feed speed (for example, a sheet feed speed of 150 mm/s of thick sheet 3) set in advance as a sheet feed speed at which a thicker recording medium than the first sheet can be fed. Further, in order to perform detailed detection, it is preferable to increase the number of times of reading by the sensors within a surface of the sheet to improve the accuracy. Downstream of the skew correction rollers 72, the sheet may be conveyed at a conveyance speed (process speed) corresponding to sheet information detected for the sheet. For example, in a case where it is detected that the sheet type is plain paper, the sheet may be conveyed at a conveyance speed for plain paper.

Regarding image formation on the first sheet, a fixing temperature and a transfer voltage are determined under a process condition (image formation condition) according to the detected sheet information, and the image formation is performed.

For a sheet after the first sheet, an appropriate conveyance speed corresponding to the sheet information detected for the first sheet is selected, and printing is executed.

Meanwhile, the second detection mode is a mode in which sheet information is detected for a sheet other than the first sheet after the sheet information of the first sheet is determined in the first detection mode and before the first sheet feed tray 60*a*, the second sheet feed tray 60*b*, or the manual feed tray is opened. The detection in the second detection mode may be performed on all sheets except for the first sheet. For example, the detection in the second detection mode may be performed on each plurality of sheets such as every other sheet or every fifth sheet, or may be performed at the beginning and end of a job except for the first sheet.

In the second detection mode, the conveyance speed corresponds to the sheet information determined by the detection in the first detection mode. For this reason, depending on the sheet type, the conveyance speed is higher than that in the first detection mode. This shortens a time period from when the sheet reaches the medium detection sensors 91 and 92 to when the sheet reaches the skew correction roller 72. Accordingly, a detection period in the second detection mode is shorter than a detection period in the first detection mode.

Figure 8:
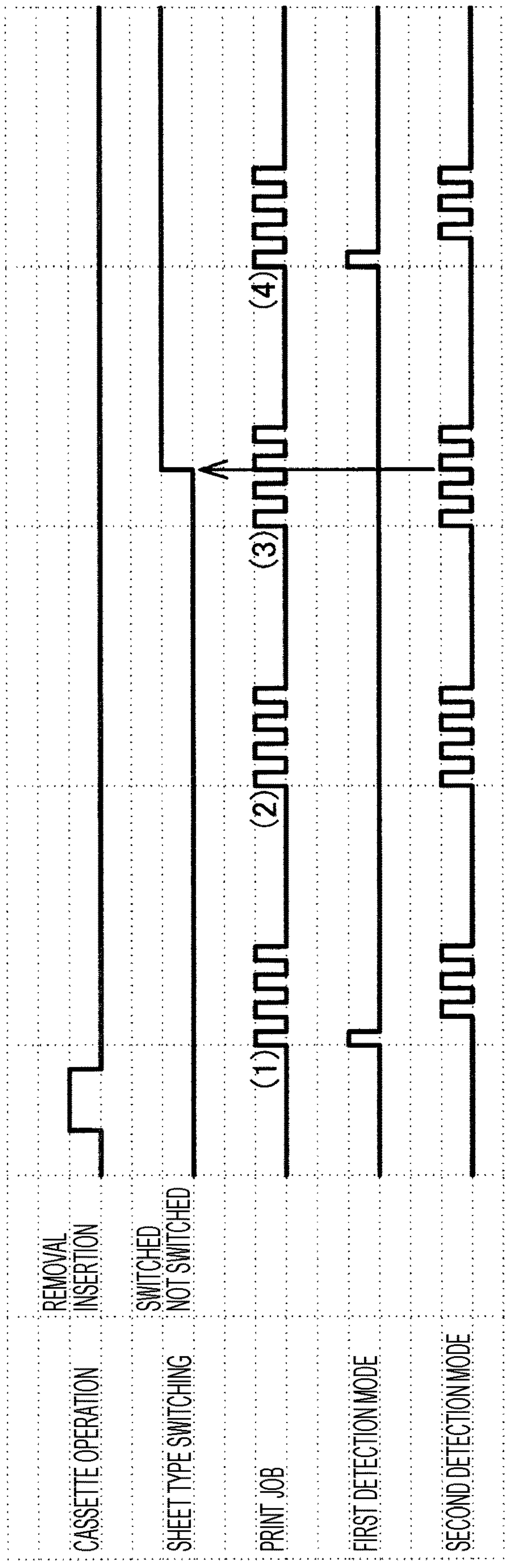
FIG. 8 is a diagram illustrating an example of a sequence in a first detection mode for detecting information relating to a recording medium conveyed first and a second detection mode for detecting information relating to a recording medium after the first recording medium.
Figure 9:
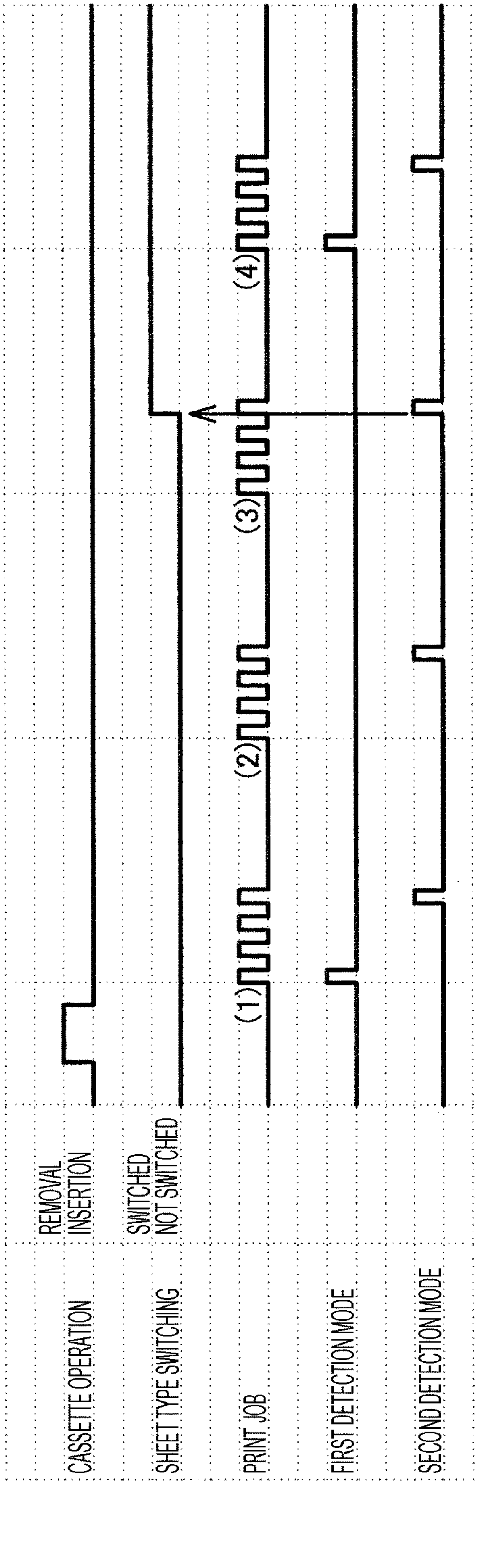
FIG. 9 is a diagram illustrating another example of the sequence in the first detection mode and the second detection mode.

FIGS. 8 and 9 illustrate different examples of a sequence in the first detection mode and the second detection mode. In FIGS. 8 and 9, for example, the first sheet feed tray 60*a* is removed and inserted (opened and closed) as indicated by a "cassette operation" signal. Thereafter, four print jobs (1) to (4) each indicating four sheets are executed as indicated by a "print job" signal.

In both FIGS. 8 and 9, in the first detection mode, the detection is performed on the first sheet fed and conveyed from the first sheet feed tray 60*a* after the first sheet feed tray 60*a* is removed and inserted (opened and closed), in other words, the first sheet in the print job (1).

On the other hand, in the second detection mode, the detection is performed on all the sheets except the first sheet in FIG. 8. In FIG. 9, the detection is performed on the last sheet in each job. Further, FIG. 8 illustrates that the switching of the sheet type (a change in sheet information) is detected by the detection of the third sheet (the eleventh sheet stacked after the opening and closing of the sheet feed cassette) in the print job (3). FIG. 9 illustrates that the switching of the sheet information is detected by the detection of the last sheet in the print job (3). By such detection, the image forming apparatus 1 can detect that different types of sheets have been added in the same sheet feed cassette.

In the examples illustrated in FIGS. 8 and 9, the detection in the first detection mode is also performed on the first sheet in the first job (print job (4)) after the detection of the switching of the sheet information.

The image forming apparatus 1 may be configured to be able to perform the detection described with reference to FIGS. 8 and 9 as the second detection mode, and may select either one of the detection described with reference to FIG. 8 and the detection described with reference to FIG. 9 according to the performance of the image forming apparatus 1 and the type of sheet to be conveyed. For example, in a case where the processing performance of the image forming apparatus 1 is low and the conveyance speed of sheets is high, there is a possibility that various kinds of control during printing may not be performed in time for the detection of each sheet. Therefore, the image forming apparatus 1 may detect a physical property value or a sheet type of only the last sheet in a job as illustrated in FIG. 9 to reduce a control load. Not only the last sheet in the job but also every predetermined number of sheets such as every two sheets or every three sheets may be detected.

In addition, in this embodiment, whether the second detection mode described above is performed can be set by the user operating the operation panel section 50. Some users may perform printing by placing a cover sheet and an inner sheet in the same sheet feed cassette at the time of booklet printing. An image forming apparatus or a sheet feed cassette used in such a manner needs to be provided with a mechanism for preventing inadvertent switching of a sheet type. When the second detection mode is set not to be performed, only the first detection mode is performed.

In this embodiment, sheet information detected by each of the medium detection sensors 91 and 92 is a physical property value or a sheet type of a sheet. The physical property value may include at least one of transmittance information, reflectance information, stiffness information, thickness information, basis weight information, size information, grain direction information, color information, moisture information, smoothness information, resistance information, friction information, or configuration information of the sheet. The configuration information of the sheet includes information of at least one of a pulp material, a coating agent, a fluorescent agent, or a filler.

The table illustrated in FIG. 10 summarizes sheet information for each detection means. For example, from the optical sensor 91, information of a sheet type, transmittance, reflectance, a basis weight, a coating agent, a fluorescent agent, a filler, color information, and a pulp material determined from the optical characteristics of a sheet is obtained. Information of the sheet type is obtained from the ultrasonic sensor 92. Further, by measuring displacement amounts of the sheet conveyance rollers by a displacement sensor, information of the stiffness of the sheet and the thickness of the sheet can be obtained. Information of the sheet size is obtained from a sheet regulating plate position sensor of each of the sheet feed cassettes 90*a* and 90*b*. Information relating to the grain direction, color, smoothness, and pulp material of the sheet is obtained from a sensor using a CMOS. Information relating to the moisture and the basis weight is obtained from an electrostatic sensor, and information of the resistance is obtained by detecting a transfer current.

As for a sheet type, the image forming apparatus 1 can determine that a physical property value of a detection target is different by providing a threshold value for the physical property value, for example, transmittance, and can thus detect types of sheets ranging from a thin sheet to a thick sheet. Furthermore, the sheets include a sheet made of at least one of a pulp material, a resin material, and a textile material, an envelope made of at least one of a pulp material, a resin material, and a textile material, and/or an OHP sheet.

Whether sheet information has been switched is determined based on, for example, whether a physical property value of a sheet has changed from a physical property value of a previous sheet by 10% or more, or whether the sheet type itself has been switched. Although this rate of change of 10% is a value that is not achieved with sheets of the same sheet type from the same sheet feed port, a threshold value for the rate of change may be changed depending on a physical property value.

The controller 100 of the image forming apparatus 1 controls the execution of each of the first detection mode and the second detection mode, and performs the following control based on a detection result.

That is, as described above, the controller 100 conveys a sheet after the first sheet by applying the conveyance speed corresponding to the sheet information detected in the first detection mode. Sheet information detected in the second detection mode may be different from the sheet information detected in the first detection mode. In this case, that is, even when switching of sheet information is detected, the conveyance speed corresponding to the sheet information detected in the first detection mode is maintained without changing the conveyance speed in a case where printing is performed according to the same job. By maintaining the conveyance speed, productivity is maintained without causing a decrease in the conveyance speed or stoppage of conveyance. Whether the sheet information detected in the second detection mode is different from the sheet information detected in the first detection mode may be determined by directly comparing the sheet information detected in the second detection mode with the sheet information detected in the first detection mode. Alternatively, in a case where the second detection mode has already been executed, the determination may be made indirectly by comparison with a result of the second detection mode that has already been executed.

However, an image forming condition corresponding to the sheet information after the switching is employed as the process condition. For example, when the sheet type is switched from plain paper to thick sheet 2, a process condition for thick sheet 2 is adopted as the process condition while a conveyance speed for plain paper is maintained.

FIG. 11 illustrates relationships between conveyance speeds (process speeds) and process conditions (in this case, the fixing temperature and the transfer voltage) before and after the switching of the sheet type. In the above-described example, when plain paper is switched to thick sheet 2, the process speed is maintained at 300 mm/s, but the setting of the fixing temperature is changed from 180° C. to 230° C. and the setting of the transfer voltage is changed from 1400 V to 1900 V.

As described above, even when the switching of the sheet information is detected, the conveyance speed of a sheet is maintained, and the process condition is changed to the optimum condition for the sheet after the switching. Thus, even when the conveyance speed is not optimal, a decrease in productivity and a decrease in image quality are prevented.

The detection of the first sheet in the first detection mode is performed on the first conveyed sheet in the next job in which the switching of the sheet information is detected. The sheet conveyance speed in this case may be the low conveyance speed in a case where the sheet information is not determined. Alternatively, the sheet may be conveyed to the skew correction rollers 72 at the sheet conveyance speed before the switching detection in the previous job, and the sheet may be conveyed downstream of the skew correction rollers 72 at the conveyance speed corresponding to the sheet information detected during the conveyance of the sheet at the sheet conveyance speed before the switching detection in the previous job.

Further, for example, when it is detected that sheet information of a sheet after the first sheet is different from the sheet information of the first sheet as in the case where it is determined that plain paper is switched to a recycled sheet, and the image forming condition is not changed, the second detection mode may be executed on a sheet conveyed first in the next job.

Further, in the sequence example illustrated in FIG. 8, when the original sheet information before the switching is detected for the fourth sheet after the switching of the sheet information is detected for the third sheet in the print job (3), there is a possibility that a different type of sheet is mixed in the third sheet. In this case, whether the sheet information is switched is determined in the last sheet in the job, and it is determined that the sheet information is not switched. Then, in the next print job (4), the detection operation is performed from the first sheet in the second detection mode.

Further, there is a case where a job is a stapling job for performing a stapling process as post-processing in a post-processing apparatus, and the switching of sheet information is detected in the middle of the stapling job. In this case, a condition corresponding to sheet information after the switching is reflected in a control condition and a prohibition condition of the post-processing apparatus while the conveyance speed is maintained. For example, when the sheet type is switched from plain paper to thick sheet 2, the number of sheets to be stapled is changed from 50 to 30 without changing the conveyance speed. Alternatively, a sheet alignment operation is performed under a condition for thick sheet 2.

Further, as a result of the detection in the second detection mode, the controller 100 of the image forming apparatus 1 stores, in the storage portion 100*d*, at least any one of sheet information after a change in sheet information in a case where the sheet information has been changed, the sheet information before and after the change, and information indicating whether the sheet has been changed. Preferably, these pieces of information are stored in association with information of the sheet feed ports 8*a*, 8*b*, and 8*c*, or information of the first and second sheet feed trays 60*a* and 60*b* and the manual feed tray. In a case where a sheet is conveyed from the sheet feeding port 8*a*, 8*b*, or 8*c* associated with information indicating that sheet information has been changed (switched), the first detection mode is desirably applied to the first sheet.

Further, the controller 100 may notify the user by displaying, on the display section 54 of the operation panel section 50, at least one of the sheet information after the change when the sheet information is changed, the sheet information before and after the change, and information indicating whether the sheet information has been changed. The controller 100 may transmit the information to the external apparatus 3 such as a cloud server or a terminal apparatus of a user, or may accept irregular or regular access from the external apparatus to share the information with the external apparatus.

Figure 12:
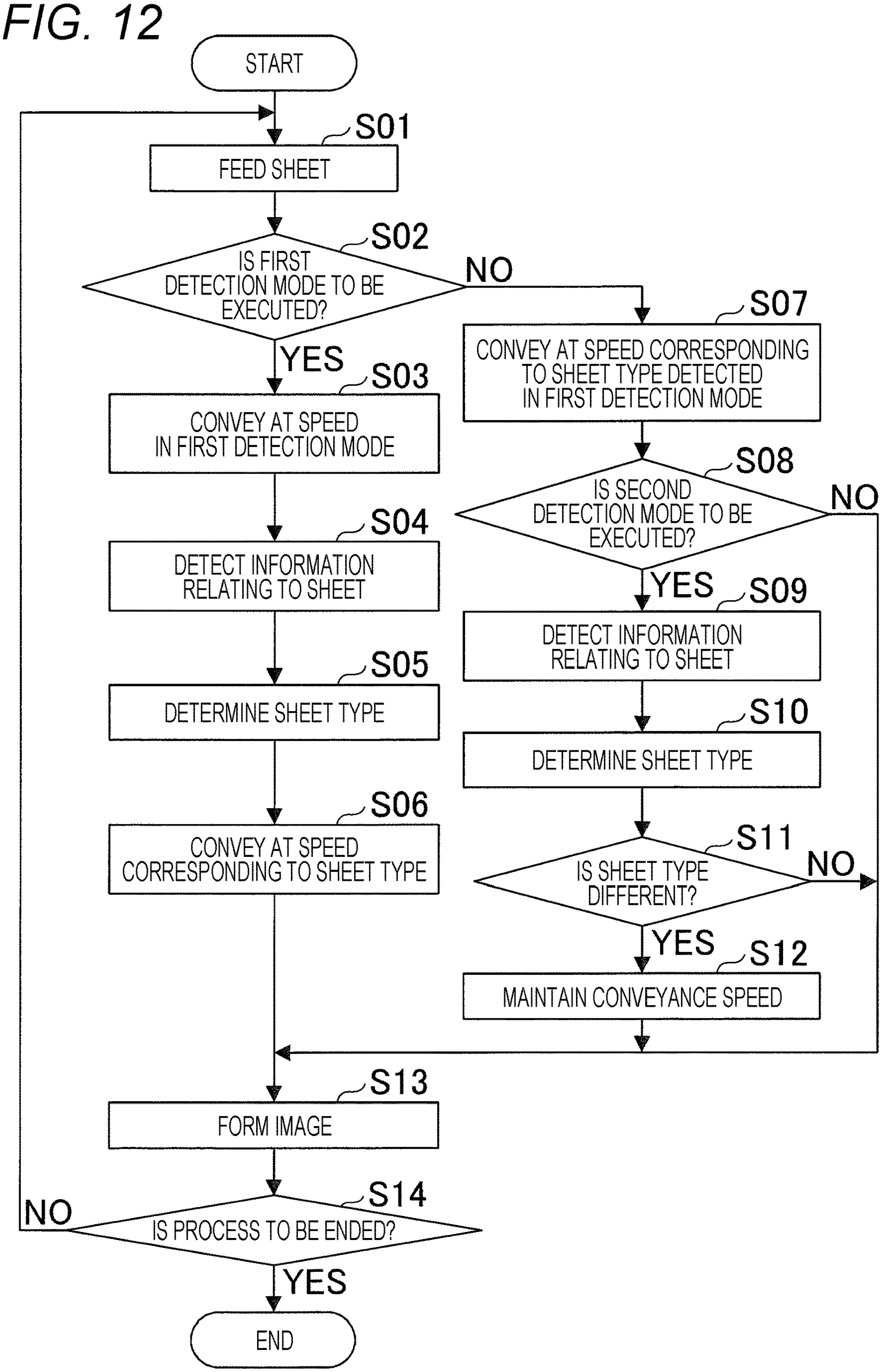
FIG. 12 is a flowchart illustrating a printing process performed by the image forming apparatus.

FIG. 12 is a flowchart illustrating a printing process performed by the image forming apparatus 1. This printing process is executed by the CPU 101 of the controller 100 of the image forming apparatus 1 operating in accordance with an operation program stored in a storage section such as the ROM 102.

In step S01, the feeding of the first sheet is started. In step S02, it is determined whether it is time to execute the first detection mode. When it is time to execute the first detection mode (YES in step S02), the process proceeds to step S03 and the sheet is conveyed at the conveyance speed in the first detection mode.

Next, in step S04, the medium detection is performed in the first detection mode to detect sheet information, and in step S05, the sheet type is determined based on the detected sheet information.

In step S06, the sheet is conveyed at a conveyance speed corresponding to the sheet type. That is, in a case where the conveyance speed in step S03 does not correspond to the sheet type, the conveyance speed is switched to a corresponding conveyance speed and the sheet is conveyed at the conveyance speed. In a case where the conveyance speed in step S03 corresponds to the sheet type, the sheet is conveyed at the conveyance speed corresponding to the sheet type. Next, the process proceeds to step S13.

When it is not time to execute the first detection mode in step S02 (NO in step S02), the sheet is conveyed at the conveyance speed corresponding to the sheet type detected in the first detection mode (the sheet type determined in step S05) in step S07.

Next, in step S07, it is determined whether it is time to execute the second detection mode. When it is time to execute the second detection mode (YES in step S08), the medium detection is performed in the second detection mode and sheet information is detected in step S09. In step S10, a sheet type is determined based on the detected sheet information. Then, in step S11, it is determined whether or not the sheet type is different from the sheet type detected in the first detection mode. Whether the sheet type is different from the sheet type detected in the first detection mode may be indirectly determined by determining whether the sheet type is different from a sheet type detected in the previous second detection mode.

In a case where the sheet types are different (YES in step S11), the conveyance speed is maintained in step S12, and the process proceeds to step S13. In a case where the sheet types are not different (NO in step S11), the process proceeds to step S13.

Also when it is not time to execute the second detection mode in step S08 (NO in step S08), the process proceeds to step S13.

In step S13, an image is formed under a process condition corresponding to the sheet type detected in the first detection mode or the second detection mode, and then in step S14, it is determined whether or not a print job has been completed. In a case where the print job has not been completed (NO in step S14), the process returns to step S02 and the next sheet is fed. Thereafter, the operations of steps S02 to S14 are repeated. In a case where the print job has been completed (YES in step SS14), the process ends.

Note that although the sheet type is determined in steps S05 and S10, whether the sheet has been changed may be determined based on a physical property value.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a conveyance section that conveys a first recording medium and a second recording medium;

a sensor that detects information relating to the first recording medium and information relating to the second recording medium; and a hardware processor that causes the sensor to detect the information relating to the first recording medium conveyed first by the conveyance section and to detect the information relating to the second recording medium conveyed by the conveyance section after the first recording medium in a job, causes the conveyance section to operate such that the first recording medium is conveyed at a first conveyance speed to detect the information, and the second recording medium is conveyed at a second conveyance speed based on the information relating to the first recording medium, and causes the conveyance section to operate such that the second recording medium is conveyed at the conveyance speed maintained and to operate such that a recording medium, conveyed first of a job next to the job that the information relating to the second recording medium after the first is detected to be different from the information relating to the first recording medium, is conveyed at the first conveyance speed again when the information relating to the second recording medium after the first recording medium is detected to be different from the information relating to the first recording medium.

2. The image forming apparatus according to claim 1, wherein the hardware processor causes the sensor to detect information relating to the second recording medium for a plurality of recording media conveyed by the conveyance section.

3. The image forming apparatus according to claim 1, wherein the information relating to the first and second recording media is a physical property value of the first and second recording media or a type of the first and second recording media.

4. The image forming apparatus according to claim 3, wherein a different threshold value is set for the physical property value, and when the physical property value exceeds the threshold value, the physical property value is determined to be different.

5. The image forming apparatus according to claim 1, wherein the first and second recording media include an envelope made of at least one of a pulp material, a resin material, and a textile material, and/or an OHP sheet.

6. The image forming apparatus according to claim 1, wherein the first recording medium conveyed first is at least one of a recording medium conveyed first from a sheet feed port after the sheet feed port is closed, a recording medium conveyed first from the sheet feed port when a state changes from a state in which no recording medium is present to a state in which the recording medium is present, a recording medium conveyed first from the sheet feed port without information relating to the recording medium, and a recording medium conveyed first after a function of the sensor is switched from OFF to ON.

7. The image forming apparatus according to claim 1, wherein when information relating to a recording medium detected by the sensor changes, the hardware processor changes an image forming condition other than the conveyance speed by the conveyance section.

8. The image forming apparatus according to claim 1, wherein when information relating to a recording medium detected by the sensor changes, the hardware processor reflects the change in a control condition and a prohibition condition of a post- processing apparatus.

9. The image forming apparatus according to claim 1, wherein when information relating to a recording medium detected by the sensor changes, the hardware processor stores, in a storage section, at least one of information relating to a recording medium after the change, the information relating to the recording media before and after the change, and information indicating whether the information relating to the recording medium has changed.

10. The image forming apparatus according to claim 9, wherein when information indicating that the information relating to the recording medium has changed is stored in the storage section, the hardware processor causes the sensor to perform detection on a subsequent first recording medium in the same manner as the detection of the information relating to the first recording medium conveyed first.

11. The image forming apparatus according to claim 1, wherein the hardware processor causes the sensor to perform detection on a recording medium conveyed after the first recording medium on at least one of all recording media after the first recording medium, every arbitrary number of recording media, or a last recording medium in a job.

12. The image forming apparatus according to claim 1, wherein the conveyance section conveys the first recording medium at a feed speed set in advance as a feed speed at which thicker recording media than the first recording medium can be fed.

13. The image forming apparatus according to claim 1, wherein the hardware processor determines whether the information relating to the second recording medium after the first recording medium is different from the information relating to the first recording medium based on a change rate from a physical property value of the first recording medium or a difference between types of the first and second recording media.

14. The image forming apparatus according to claim 1, wherein when the information relating to the second recording medium after the first recording medium is detected to be different from the information relating to the first recording medium, the detected information relating to the second recording medium is notified or shared with an external apparatus.

15. The image forming apparatus according to claim 3, wherein the second recording medium that is conveyed after the first recording medium and for which whether or not the information relating to the second recording medium after the first recording medium is different from the information relating to the first recording medium is detected is a last recording medium in a job.

16. A method for controlling conveyance of a recording medium, the method comprising:

causing a conveyance section to convey a first recording medium and a second recording medium;

causing a sensor to detect information relating to the first recording medium conveyed first by a sensor and to detect information relating to the second recording medium conveyed after the first recording medium in a job;

controlling the conveyance section to convey the second recording medium at a conveyance speed based on the information relating to the first recording medium, and controlling the conveyance section to convey the second recording medium at the conveyance speed maintained and to operate such that a recording medium, conveyed first of a job next to the job that the information relating to the second recording medium after the first is detected to be different from the information relating to the first recording medium, is conveyed at the first conveyance speed again the information relating to the second recording medium after the first recording medium is detected to be different from the information relating to the first recording medium.

17. A non-transitory recording medium storing a program for causing a computer of an image forming apparatus to execute:

causing a conveyance section to convey a first recording medium and a second recording medium;

causing a sensor to detect information relating to the first recording medium conveyed first and to detect information relating to the second recording medium conveyed after the first recording medium in a job;

controlling the conveyance section to convey the second recording medium at a conveyance speed based on the information relating to the first recording medium, and controlling the conveyance section to convey the second recording medium at the conveyance speed maintained and to operate such that a recording medium, conveyed first of a job next to the job that the information relating to the second recording medium after the first is detected to be different from the information relating to the first recording medium, is conveyed at the first conveyance speed again the information relating to the second recording medium after the first recording medium is detected to be different from the information relating to the first recording medium.

* * * * *